United States Patent [19]

Moraw et al.

[11] 4,083,054

[45] Apr. 4, 1978

[54] RECORDING OR ERASURE OF IMAGES ON THERMOPLASTIC MATERIAL

[75] Inventors: Roland Moraw, Naurod; Kurt Dryczynski, Wallau, both of Germany

[73] Assignee: Hoechst Aktiengesellschaft, Frankfurt am Main, Germany

[21] Appl. No.: 634,057

[22] Filed: Nov. 21, 1975

[30] Foreign Application Priority Data

Nov. 25, 1974 Germany ............................ 2455742

[51] Int. Cl.[2] ............................................ G01D 15/10

[52] U.S. Cl. ..................................... 346/151; 219/497

[58] Field of Search ............... 219/201, 251, 499, 497, 219/501, 20; 346/151

[56] References Cited

U.S. PATENT DOCUMENTS

| | | | |
|---|---|---|---|
| 2,918,558 | 12/1959 | Evans | 219/20 |
| 3,483,359 | 12/1969 | Hewlett, Jr. | 219/497 |
| 3,547,628 | 12/1970 | Wolff | 346/151 |
| 3,719,951 | 3/1973 | Kingsley | 346/151 |
| 3,752,956 | 8/1973 | Cahill | 219/497 |
| 3,789,190 | 1/1974 | Orosy | 219/497 |

*Primary Examiner*—Jay P. Lucas

*Attorney, Agent, or Firm*—Bacon & Thomas

[57] ABSTRACT

A method and apparatus for recording and erasing images on thermoplastic photoconductive recording material wherein an adjustable heat supply is provided to the recording medium dependent upon the temperature of the recording medium at the start of the heating cycle. A bridge circuit is disclosed for heating the recording medium and for sensing the temperature thereof such that the heating current supplied to the heating means is regulated according to the instantaneous temperature of the recording medium.

19 Claims, 6 Drawing Figures

RECORDING OR ERASURE OF IMAGES ON THERMOPLASTIC MATERIAL

BACKGROUND OF THE INVENTION

1. Field of the Invention

This invention relates to methods and apparatus concerned with the recording or erasure of images on thermoplastic material.

2. Description of the Prior Art

In the recording and erasing of deformation images on a thermoplastic photoconductive recording material, the material by charging by means of a corona device and subsequent exposure, carries a charge image which is thermally developed by heating up to the softening range of the recording material and which can be erased by renewed, longer heating at the same temperature or by heating at a higher temperature.

Such processes are suitable inter alia for recording and erasing holograms, for which in addition to silver halide films, photo-lacquered layers or manganese/bismuth layers, thermoplastic photoconductive layers in particular are used.

Such recording materials contain either a photoconductor dispersed in a thermoplastic or a photoconductive layer which is provided with a thermoplastic covering layer. Known photoconductors are poly-n-vinylcarbazole with an addition of trinitrofluorenone as well as copper phthalocyanin or substituted pyrenes. Customary thermoplastics are Staybelite Ester 10®, a hydrogenated rosin ester, polystyrenes or polyacrylates. Such recording materials are electrostatically charged, exposed with a light-shadow pattern, possibly in the form of a hologram, if necessary charged again and developed by applying heat such as radiation or joulean heat. The softened thermoplastic layer is deformed in accordance with the charge image to form a deformation image which can be made visible by a schlieren technique. In the case of holographic recording a phase hologram is obtained. By renewed heating the deformation image or the phase hologram can be erased again. It is also possible for charge images to be produced on thermoplastic layers by charge transfer or directly, for example, by electron beam recording.

There is a great interest in recording and erasure of deformation images in the field of holography. The following standard technique is used for this: On a glass plate, as carrier plate for the photo-thermoplastic material, conductive areas of the magnitude of the holograms to be prepared are produced from transparent conductive layers such as tin oxide of approximately 50 ohm/square, over which joulean heat is supplied. Opposite sides of the conductive areas are strengthened by electrodes consisting of, for example, gold and are provided with lead wires. The necessary quantity of heat is produced by applying a voltage for a predetermined period.

The ranges of tolerance of the heat energy to be supplied to the thermoplastic layer for thermal development are only a few percent. If during the developing time the thermoplastic layer does not soften to the extent of being deformable by the electrostatic forces originating from the charge image then the layer surface remains smooth. If the thermoplastic layer is only slightly softer than is necessary then as a result of increased dark conductivity the electrostatic charges leak away so quickly that once the electrostatic forces of the image are no longer present the mechanical surface tension flattens the deformation image. In order to obtain good relief images the necessary quantity of heat must accordingly be dosed in such a manner that the narrow temperature range for the deformation of the thermoplastic layer is reached and maintained. In the case of constant voltage and time values, which is tantamount to a quantity of heat of constant magnitude, the system must therefore always be in the same initial thermal state. In practical operations it has therefore been necessary for any subsequent recording process to wait until the system has cooled again, for example to room temperature. Variations in the room temperature always require a re-adjustment of the heating device for the thermal development. In accordance with experience the cooling times last for some minutes, which has been found to be unsatisfactorily long for quick, and under certain circumstances irregular recording sequences, in particular the case of cyclic recordings with alternate recording and erasing operations. Although measures for accelerating the cooling, such as fans, can shorten the cooling time to some extent they require, in addition, periodic operation unless they are specially controlled.

SUMMARY OF THE INVENTION

It is therefore an object of the invention to provide a process and an apparatus for carrying out the process, which renders possible, irrespective of room temperature, a quick recording sequence for thermal development of charge images on thermoplastic layers into qualitatively good relief images even in the case of different recording intervals with alternating recording and erasing operations.

The process achieving this object is characterized in that there is supplied to the thermoplastic recording material with the charge image a quantity of heat, adapted to the respective temperature of the recording material at the point in time when the heat is supplied, for reaching the required final temperature for the thermal development of the charge image into a deformation image or for erasing the deformation image.

The heat for a new recording process is advantageously supplied during the cooling of the recording material when it has reached that temperature which is just below the deformation temperature necessary for the thermal development. Preferably, the quantity of heat required for a new recording process is supplied at a temperature which is 7° to 15° C lower than the deformation temperature. An amplified and filtered measuring signal voltage, corresponding to the measured temperature of the recording material, is preferably subtracted or compared with an adjustable reference voltage corresponding to the desired final temperature of the recording material, and the signal obtained from the measuring signal voltage and reference voltage is used for regulating the supply of heat to the recording material.

This process has the advantage that for the thermal development or erasure it is not a constant thermal energy that is supplied to the thermoplastic photoconductive recording layer but a variable quantity of heat adapted to the specific original temperature of this layer, so that irrespective of the specific original temperature the preselected final temperature in each case of the recording material is always achieved. This saves time as a result of the shortening of the recording intervals and in addition the consumption of current for recording and erasing the deformation images is reduced.

The apparatus for recording and erasing deformation images on a thermoplastic photoconductive recording material is characterized in that a heating element heating the thermoplastic recording material is arranged as the temperature dependent resistor in a resistance bridge circuit and is provided as the temperature measuring element for determining the temperature of the thermoplastic photoconductive recording material, and that the resistance bridge circuit is connected to a control means for obtaining a control signal for regulating a switch contact in a current supply line which supplies the heating element.

In a preferred manner, the heating element is in the form of a transparent plate with a conductive layer on which a polyester film with the thermoplastic photoconductive recording material is placed or is movable above the transparent plate. This arrangement renders measurement of the surface temperature of the thermoplastic recording layer possible. Instead of measuring the temperature of the surface of the thermoplastic recording layer, it is sufficient here to measure the temperature of the heating element lying closely below it, which heating element can consist, for example, of a glass plate carrier with a conductive layer. The temperature measurement is thus still adequately accurate if the thermoplastic photoconductive recording layer is not mounted directly on the photoconductive layer of the glass plate carrier but on an intermediate carrier film of, for example, polyester of a thickness of up to 100$\mu$.

By using the heating element simultaneously as a temperature measuring element, an additional component such as, for example, a measuring resistance having a large temperature coefficient, is not necessary, since the temperature measurement can be carried out directly by measuring the change in resistance of the conductive layer of the heating element. It is obviously also possible to use other temperature measuring elements which enable a quick indication of the respective temperature of the thermoplastic recording layer. Elements suitable for this are, for example, liquid crystals which when they reach a particular temperature undergo a change in color. This change in color can be interpreted photoelectrically in order to obtain a corresponding voltage signal which permits the measurement of the surface temperature of the thermoplastic recording layer.

The apparatus has the advantages that on account of the use of the heating element required for heating the recording material as a temperature measuring element, an additional temperature measuring member is not necessary, and that a very precise regulation of the temperature ranges necessary for recording and erasing the deformation images is possible. Additionally, current consumption is lower than in known heating devices, and the recording and erasing sequences can be shortened considerably even without additional cooling means such as fans.

BRIEF DESCRIPTION OF THE DRAWINGS

By way of example only, certain illustrative embodiments of the invention will now be described with reference to the accompanying drawings, in which.

DETAILED DESCRIPTION OF THE PREFERRED EMBODIMENTS

Figure 1:
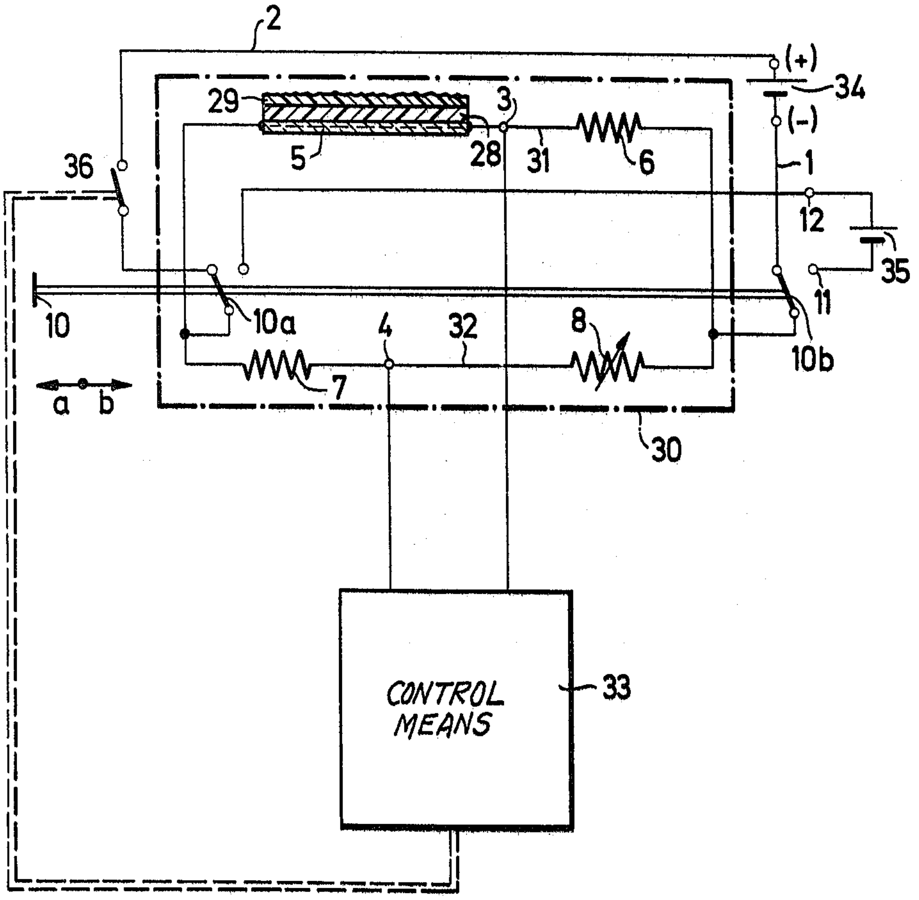
FIG. 1 is a schematic circuit diagram of apparatus embodying the invention consisting of a resistance bridge circuit and a control circuit.

In FIG. 1 a glass plate, provided with a conductive layer of AURELL-S® made by Deutsche Balzers GmbH, Geisenheim/Rhine and having an active area of 5 × 3 cm is used as a transparent heating element 5 and connected in a resistance bridge circuit. The resistance of such a plate, measured over the width of 3 cm, is between 10 and 25 ohms. The increase in resistance with temperature amounts to approximately 0.01 ohms/degree. Similar temperature dependencies can be measured in other conductive transparent layers, for example tin oxide.

Such an increase in resistance is large enough, when measuring with a resistance bridge circuit with thermostable reference resistances, to obtain a control signal, for regulating the heat energy to be supplied, at an output of the bridge circuit.

The heating element 5 and a first fixed resistor 6 form a first pair of bridge arms 31 through which passes a heating current supplied to the resistance bridge circuit 30 from a heating current source 34 by way of current supply lines 1 and 2. A second fixed resistor 7 and a variable resistor 8 are connected to form a second pair of bridge arms 32 for the zero adjustment of the resistance bridge circuit 30 and in addition serve to produce a reference potential in the second pair of bridge arms 32 which is created by only a very small fraction of the heating current, namely less than 1%. An output voltage is tapped off at the terminals 3 and 4 of the resistance bridge circuit 30 and fed into a control means 33, the circuit of which is described in detail later. The output voltage after processing with a predetermined reference voltage in the control means 33 actuates a switch 36 arranged in the current supply line 2, which switch opens and closes the supply line 2 to the heating element 5 in accordance with the duration of the control signal supplied by the control means 33 and thus controls the supply of heat to this heating element 5 in conformity with the quantity of heat necessary to record or erase a deformation image on a recording material 29 which is applied in the form of a layer to a polyester film 28 which is arranged on the heating element 5 or is moved thereabove.

By means of the variable resistor 8, the bridge circuit 30 is adjusted to zero balance at a predetermined reference temperature. So as to keep the heating of the resistors 6, 7 and 8 of the bridge circuit 30 as low as possible during this period, preferably a supply voltage which is only very small, for example, 1 volt, is used for the zero balance, the voltage being supplied by a calibration voltage source 35. Although in FIGS. 1 to 5 the calibration voltage source 35 is shown as d.c. source, it is possible to use an a.c. source instead.

When the heating voltage is applied, the heating element 5 is heated, as a result of which its resistance is also changed on account of it having a significant temperature coefficient of resistance. As a result, a voltage which increases as the temperature of the heating element increases is produced at the output terminals 3 and 4. To achieve a high degree of accuracy in the measurement, the layout of the bridge circuit 30 is so designed that the bridge resistors 6, 7 and 8 are heated as little as possible during the heating of the heating element 5, and furthermore it is ensured by the selection of very low temperature coefficients for these resistors that their resistance values vary as little as possible when the temperature is increased or lowered.

Figure 2:
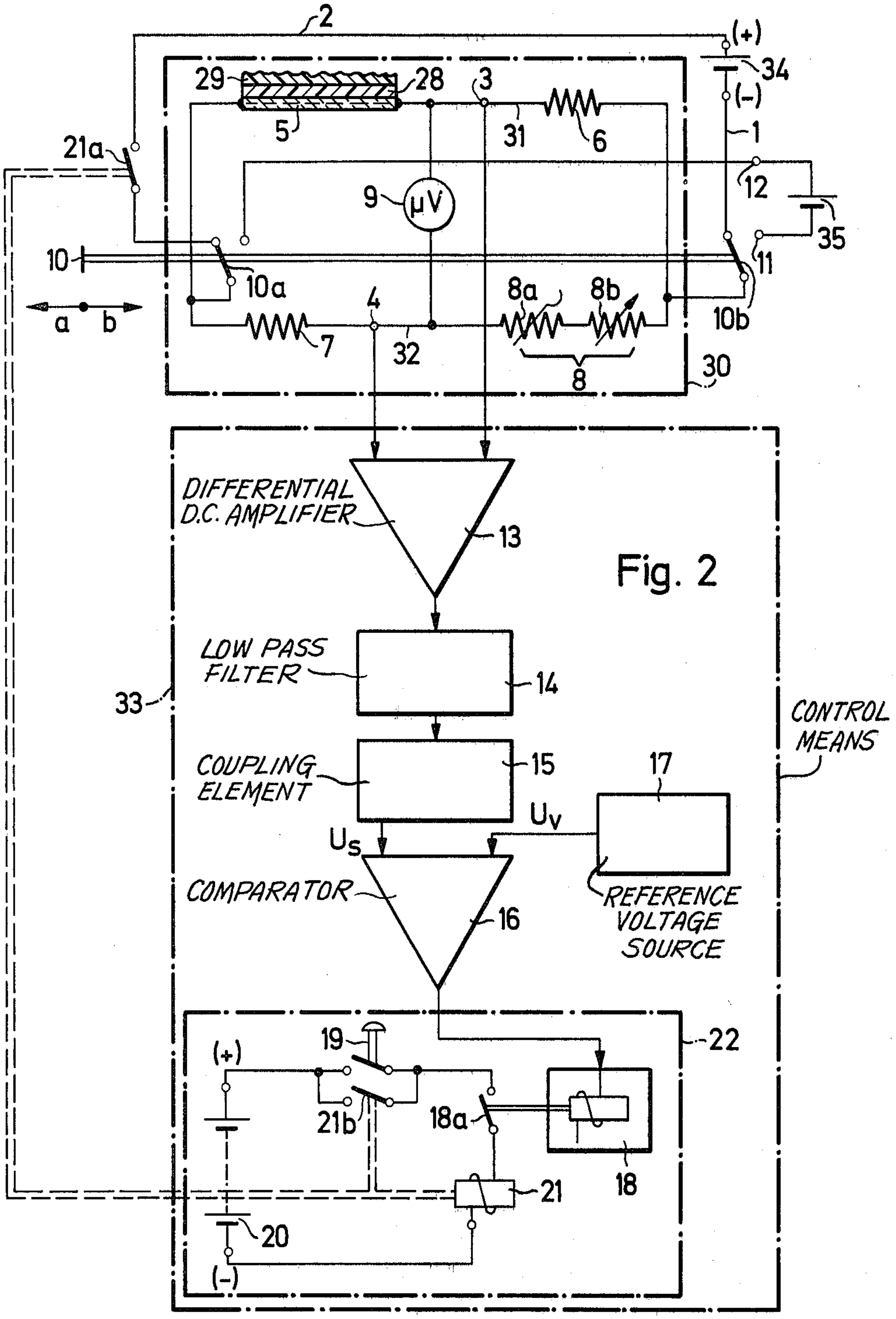
FIG. 2 shows the circuit diagram of apparatus embodying the invention in which direct current is supplied to a heating element.

FIG. 2 shows a heating device with a control means 33 for supplying direct current to the heating element 5 in the resistance bridge circuit 30. There is provided as heating element 5 a transparent plane heating element "AURELL" ® made by the firm Balzers having a resistance at 20° C of approximately 16 ohms. The increase in resistance of the heating element 5 with temperature amounts to 7 milli-ohms per ° C. The variable resistor 8 for the zero balance of the resistance bridge circuit 30 consists preferably of a combination of a resistance decade 8*a* with a precision potentiometer 8*b*. The resistance decade consists in the simplest case of a series arrangement of 10 resistors with a value sequence 1, 2, 3 . . . 10, which by means of a simple change-over switch can be tapped off at any junction points. By connecting in series several individual decades with resistance values increasing in each case by one order of magnitude, any resistance within the range of variation can be obtained. To achieve a high degree of accuracy in the measurement, the bridge resistors 6, 7, 8*a* and 8*b* must have the smallest possible temperature coefficients, which is achieved by the use of precision wire and metal film resistors. The fixed resistor 6 disposed in the first pair of bridge arms 31 acting as heating circuit consists of a low impedance high power resistor of, for example, 0.5 ohm, of which the heating by the heating current is negligible on account of the small resistance value. The second pair of bridge arms 32 serves for the formation of the reference potential and for the zero adjustment of the resistance bridge circuit 30. It therefore comprises relatively high impedance resistors 7, 8*a* and 8*b* of low power rating. Thus, for example, the resistance value of the second fixed resistor 7 of the bridge circuit 30 is approximately 96 kilohms. The resistance decade 8*a* and the precision potentiometer 8*b*, which takes the form, for example, of a 10 turn helical potentiometer, render possible the adjustment with high resolution (about 10 milliohm) of any optional resistance value up to approximately 1000 ohm. As a result the zero point of the bridge can be adjusted very accurately within a large range of variation, which is of great advantage above all when changing the heating element 5 since there is a relatively large variation in the resistance of the heating element resistors from element to element, the range can be between 10 and 25 ohms. A voltmeter 9 with a measuring range down to microvolts is provided for reading the output voltage of the bridge.

Arranged in the current supply lines 1 and 2 of the resistance bridge circuit 30 are contacts 10*a* and 10*b* of a change-over switch 10, which, in a first operative position *a* of the change-over switch 10, connect the resistance bridge circuit 30 to the heating current source 34, and, in a second operative position *b* of the change-over switch 10, connect the resistance bridge circuit 30 to the calibration voltage source 35 by way of the terminals 11 and 12 for carrying out the zero balance.

The thermal development and erasing processes of the photoconductive thermoplastic layers operate at temperatures of approximately 60° or 80° C. For this 30 to 400 watts are required, depending on the duration of the heating pulses, which for the heating resistance of 16 ohms used indicates that heating voltages of 20 to 80 volts must be employed. In the case of the smallest mentioned heating voltage of 20 volts, for an increase in temperature of the recording layer 29 of 20° C to the appropriate final temperature the bridge produces an output voltage of approximately 12 or 15 millivolts, with which the required control processes are triggered in the control means 33 comprising a number of series-connected devices.

The control means 33 for supplying direct current, shown in FIG. 2, has a differential direct current amplifier 13, which produces, for example, a hundred fold amplification of the output voltage of the bridge. The zero point drift of this differential amplifier 13, caused by temperature change, is kept as small as possible and amounts preferably to less than ±5 microvolts per ° C. Under normal environmental conditions, that is normal room temperatures of 20° C, a measuring accuracy of ±1° C can be achieved. Obviously, when using an amplifier with a smaller zero point drift it is possible to achieve a greater measuring accuracy. The output of the amplifier 13 is connected to a low-pass filter 14 which suppresses mains voltage disturbances and other voltage disturbances. For achieving as short a switching time as possible, which in practice is limited only by the operate and release times of the relay used, the low-pass filter 14 is designed, for example, for a limiting frequency of 20 hertz and a high edge steepness of 24 db/octave. By the specification of the edge steepness of electric filters as db/octave is meant that in the case of a low-pass filter, the attenuation of a signal is done with double the limiting frequency in db, and in the case of a high-pass filter the attenuation refers to a signal of half the limiting frequency.

The filtered measuring signal is fed to a coupling element 15; this can be a photoelectric coupler which serves for the separation of potential between the measuring circuit and a comparator 16 as well as a relay arrangement 22. By means of this coupling element 15 feedback to the resistance bridge circuit 30 from the comparator 16 and the relay arrangement 22 (for example, voltage peaks when switching the relays 18 and 21 is avoided.

The output measuring signal $U_s$ of the coupling element 15 is supplied to the comparator 16 to which there is also fed an adjustable reference voltage $U_v$ from a reference voltage source 17. As soon as the measuring signal $U_s$ has reached the amplitude of the reference voltage $U_v$, which corresponds to the desired final temperature of the heating element 5, there is an abrupt change of voltage at the output of the comparator 16 which triggers the relay arrangement 22.

The relay arrangement 22 consists of a first relay 18 and a second relay 21, wherein a first relay contact 18*a* of the first relay 18 is connected in series with a starting button 19, with the second relay 21 and with a current source 20. A second relay contact 21*b* of the second relay 21, which contact is arranged in parallel with the starting button 19, maintains the flow current through the relay for the heating period by the current source 20 when the starting button is depressed. A first relay contact 21*a* of the second relay 21 in the current supply line 2 to the heating element 5 opens as soon as the first relay 18, after triggering the relay arrangement 22 by the abrupt change in voltage at the output of the comparator 16 is energized and thus opens the first relay contact 18*a*.

In detail, the control process proceeds as follows:

By pressing the starting button 19 the current source 20 is connected to the relay 21 so that by closing the relay contact the heating circuit is closed. The second relay contact 21*b* of the relay 21 maintains the current flow through the relay 21 during the whole of the heating period. When the desired final temperature is reached, the relay 18 is energized by means of the comparator 16 and the relay contact 18*a* opens, whereby the relay 21 is de-energized and by means of its first contact 21*a* switches off the heating current. As a result the first relay 18 is also de-energized so that the relay arrangement 22 is ready for a new heating procedure.

Figure 3:
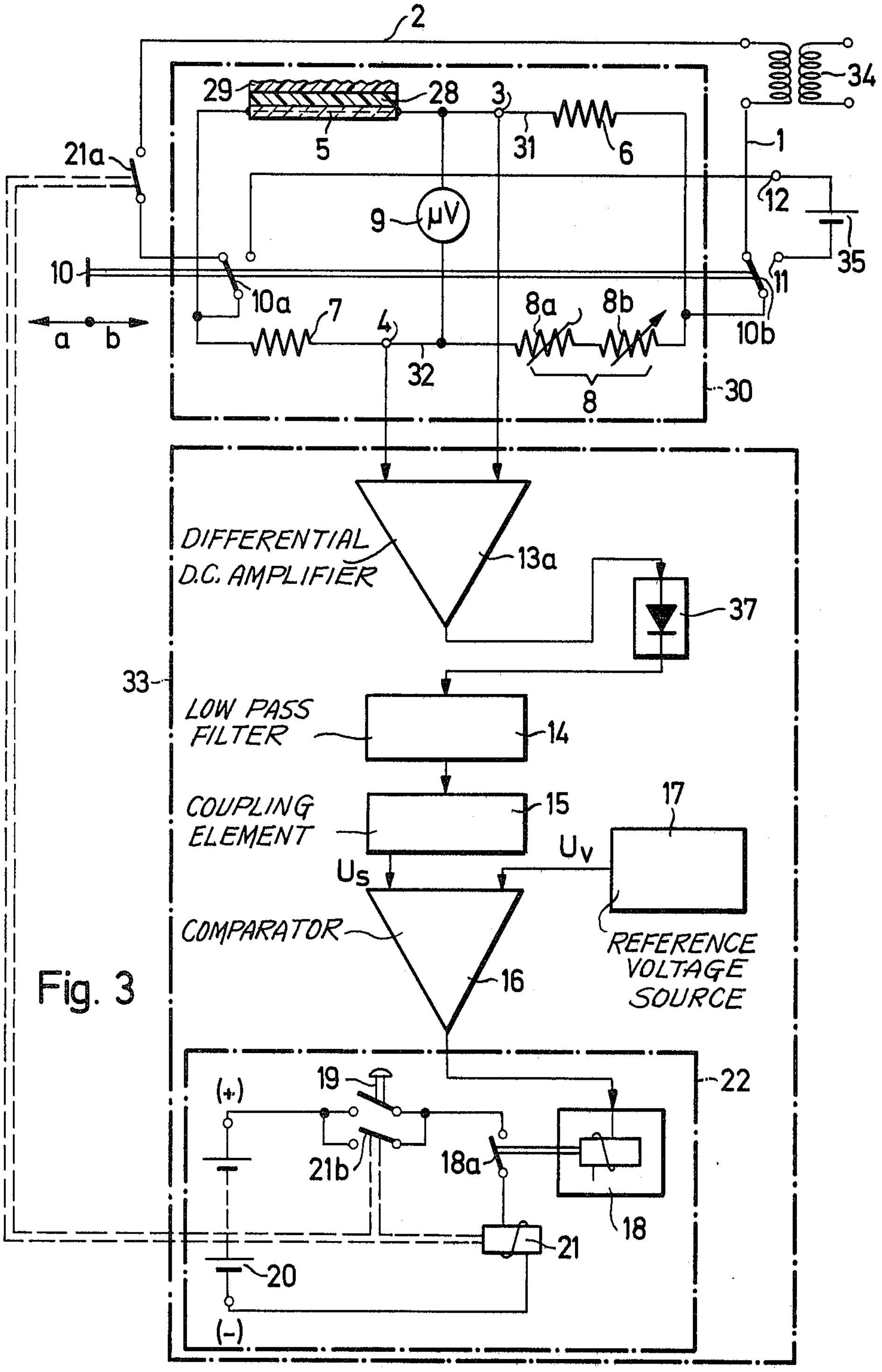
FIG. 3 shows another embodiment in which alternating current is supplied to a heating element.

In the embodiment of the invention shown in FIG. 3 the heating element 5 is heated by means of an a.c. source, for example as shown, the connecting terminals of the supply lines 1 and 2 for the heating circuit are supplied from the mains by way of a transformer. The amplification of the measuring signal is effected with the assistance of an a.c. differential amplifier 13*a*, in which as regards its zero point stability not such high demands have to be made as in the case of a d.c. amplifier. The output of the a.c. differential amplifier 13*a* is connected to a rectifier stage 37 which is connected to the low-pass filter 14.

The operating procedure and the design of the remaining switching stages and units of the control means 33, which bear the same reference numbers as the corresponding parts of the embodiment shown in FIG. 2, are identical in their method of operation and in their design to the afore-described units of the embodiments according to FIG. 2 and do not need to be described again.

Figure 4:
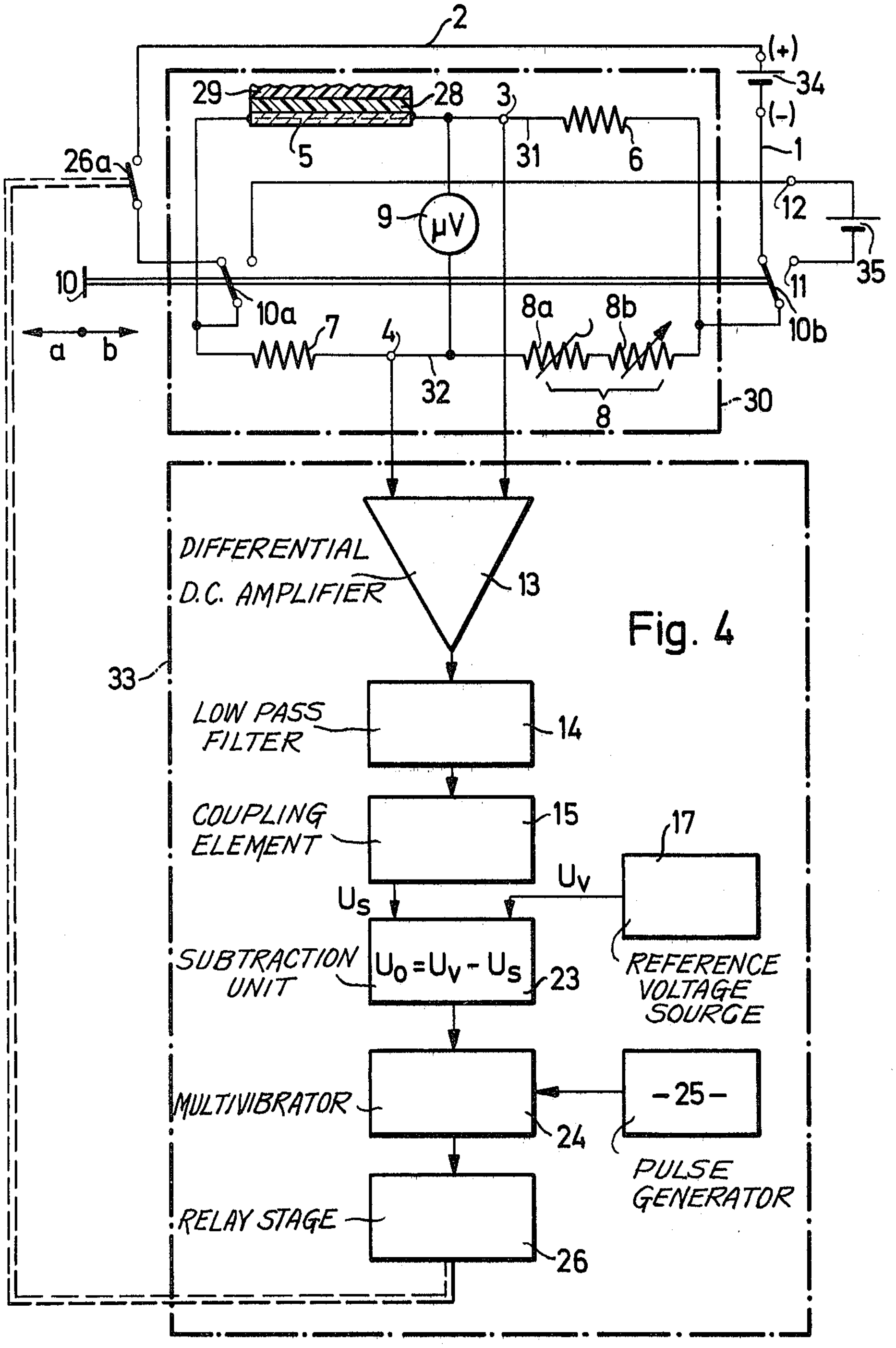
FIG. 4 and FIG. 5 each show a respective further embodiment in which there is a pulse width control of a supply to a heating element.

In the embodiment shown in FIG. 4, the control of the degree of heating of the heating element 5 is effected by means of a time-controlled pulse voltage. In this case the heating supply to the heating element 5 is pulsed and controlled by the pulse width, in dependency on the temperature achieved in each case. The measuring signal voltage $U_s$ of the coupling element 15 is subtracted from the pre-selected reference voltage $U_v$ from the reference voltage source 17 in a subtraction unit 23, and the resulting differential voltage $U_o$ is fed, as control voltage, to a monostable multivibrator 24 which is controlled by a pulse generator 25 producing narrow spikes of adjustable repetition frequency. The output pulse duration of the multivibrator 24 depends on the amplitude of the differential voltage $U_o$. The output pulses of the multivibrator 24 trigger a relay stage 26, of which the relay contact 26*a* is arranged in the current supply line 2 for heating the element 5 in the resistance bridge circuit 30. To select the heating speed the pulse repetition frequency is adjusted at the pulse generator 25. In this manner the control can be effected after switching on the heating voltage in such a manner, that, for example, in the case of a cold heating element heating pulses with a ratio of heating pulse duration to pulse interval of 1:1 are produced, whereas in the case of a heating element that is still warm the duration of the heating pulse is correspondingly shorter with respect to the interval between pulses. The pulse generator 25 is such as to permit a particularly small mark-to-space ratio, that is, the ratio of the duration of the heating pulses to the interval between pulses. As soon as the desired final temperature is achieved the heating pulse duration becomes only a very small fraction of the pulse interval, so that the heating element is not heated any further to any significant degree.

Figure 5:
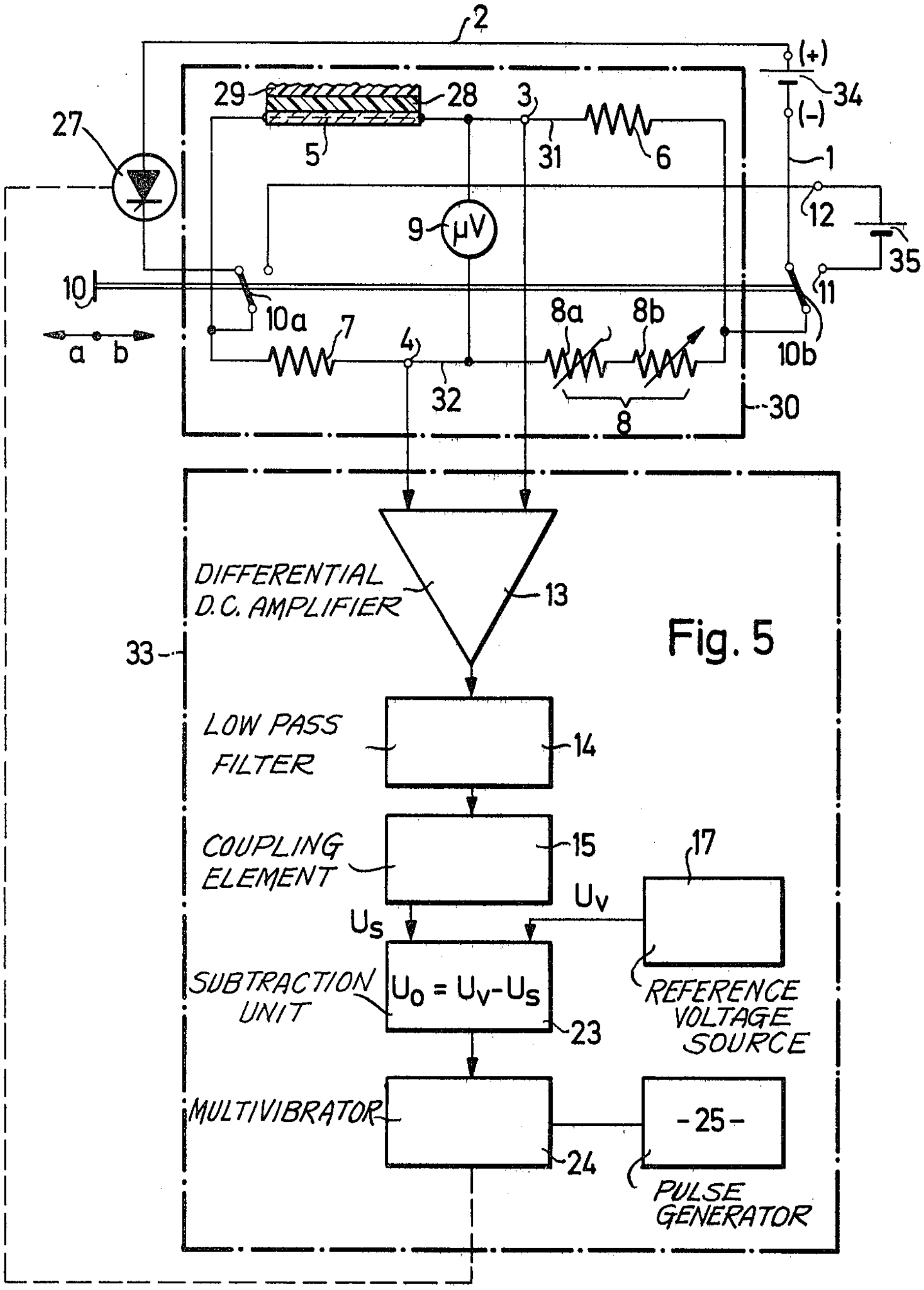

For very rapid switching procedures, a power switch 27, shown in FIG. 5, comprising semi-conductor elements for example built up of a thyristor, must be used instead of the relay stage 26 shown in FIG. 4. The low-pass filter 14 must then be designed in accordance with the desired working frequency range.

Figure 6:
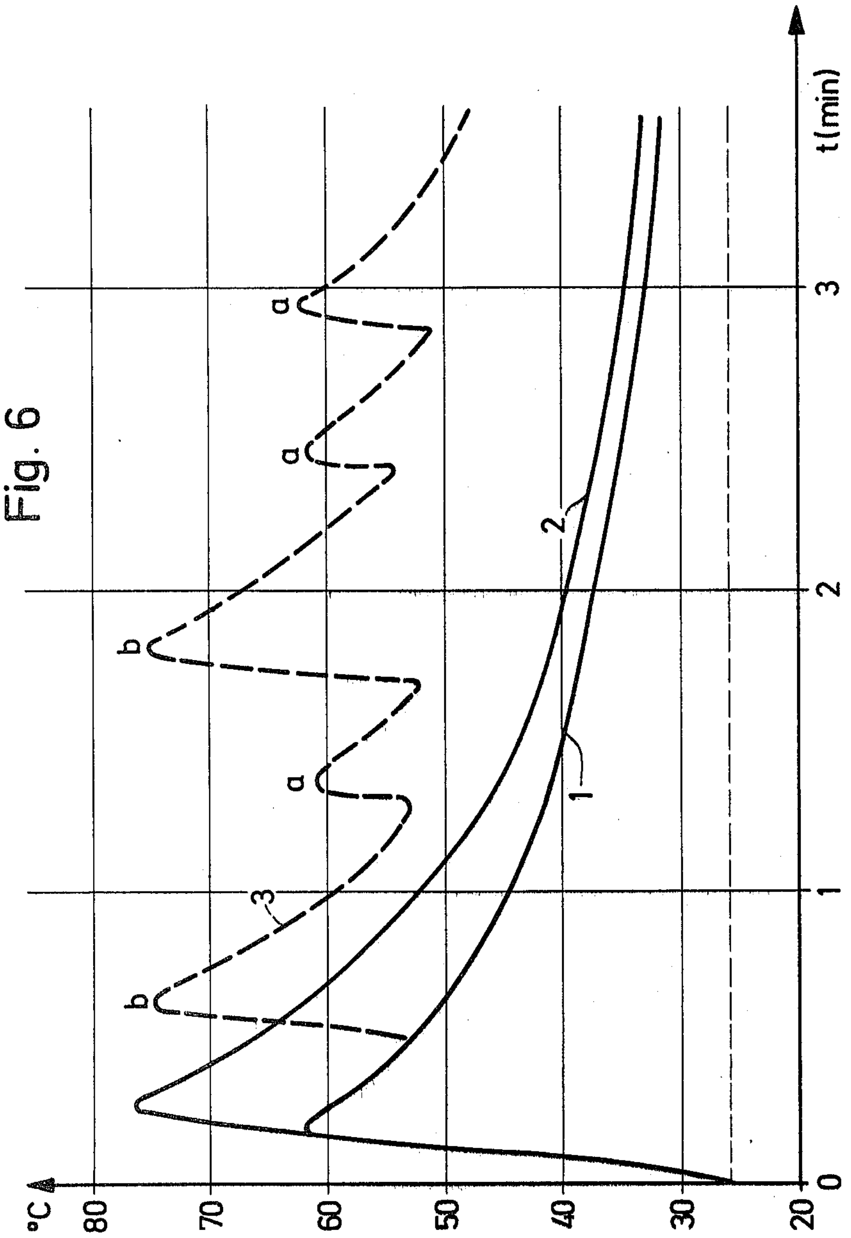
FIG. 6 shows temperature-time curves relating to a heating element with an overlying polyester film with a thermoplastic photoconductive recording layer and forming part of the embodiment shown in FIG. 2.

FIG. 6 shows temperature-time curves, which are measured in a glass plate with an AURELL-S ® layer and a superposed polyester film having a thickness of 50μ with a thermoplastic photoconductive layer.

The polyester film is coated with a solution of 10 g of poly-N-vinylcarbazole (Luvican ® M 170 of BASF) in 250 ml of tetrahydrofuran and 10 ml of a 15% solution of 2, 4, 7-trinitrofluorenone in tetrahydrofuran on a rotating centrifuge. After 30 minutes drying at 60° C there is applied thereto in the same manner, a cover layer of 4 g of a glycerin ester of the hydrogenated colophonium (Staybelite ester 10 ® of Hercules Powder, USA) in a mixture of 80 ml of benzine (boiling point 80° - 110° C) and 20 ml of tetrahydrofuran and this is then dried.

The coated film with the thermoplastic photoconductive recording layer on the outside, is secured by means of an adhesive strip to the conductive, earthed layer of the glass plate. By means of a needle corona spaced 5 mm from the recording layer, a charge of + 8 kV is applied.

Exposure is carried out with divided light beams from an He/Ne laser, which beams are converged at such an angle that an interference pattern of 350 lines/mm is produced. The exposure energy supplied is 60 μWs/cm². For thermal development (as in the prior art technique) a voltage of 20 volts is applied for 6 seconds to the current supply lines of the opposite lying edges of the conductive layer on the carrier plate. As a result a grid-like relief image is formed. The course of the temperature in the thermal development corresponds to the curve 1. To erase the relief image (as in the prior art technique) the voltage of 20 volts is applied for 9 seconds, and the temperature course corresponds to the curve 2. The original temperature of 26° C, both after the thermal development and after the erasure, would not be reached until after approximately 6 minutes. This time span represents in a conventional method of operation the shortest time interval between exposures. Temperature measurement is achieved by liquid crystals applied to the surface of the recording layer, the color of these crystals changing when a particular temperature is reached.

The next recording and subsequent recordings are carried out by means of the above-described control device 33 for d.c. supply (FIG. 2). The thermal energy supplied is dosed in such a manner that in each case the developing temperature of 62° C and the erasing temperature of approximately 75° C are achieved. These temperatures are accurately achieved notwithstanding variation in the starting temperature of the element. In the recording material 29 of the afore-described composition, a temperature of 55° C is not sufficient for deformation or erasure, whereas a short fixing of the deformation image occurs on cooling to 55° C. Accordingly, when this temperature is reached (as indicated by the liquid crystals) during cooling a new recording operation can be commenced. The temperature course of a recording sequence carried out from this point of view is shown by the curve 3, wherein the developments are characterized by the curve peaks *a* and the erasures by the curve maxima *b*. As can be seen from the course of the curves, time intervals between exposures of approximately 15 seconds can be achieved without additional means for dissipating heat, such as fans.

We claim:

1. A method of recording or erasing an image on thermoplastic recording material comprising the steps of supplying an adjustable quantity of heat for reaching a required temperature for thermal development or erasure, said adjustable quantity of heat supplied in accordance with the temperature of the recording material at the time of supplying the heat, and resupplying said adjustable quantity of heat for a subsequent recording process during the cooling of the recording material when said recording material has reached that temperature which is just below the deformation temperature necessary for thermal development wherein the quantity of heat required for a new recording process is supplied at a temperature which is 7° to 15° C lower than the deformation temperature.

2. A method of recording an image on thermoplastic recording material comprising the steps of supplying an adjustable quantity of heat for reaching a required temperature for thermal development or erasure, said adjustable quantity of heat supplied in accordance with the temperature of the recording material at the time of supplying the heat, measuring the temperature of the recording material and supplying a signal voltage proportional thereto, comparing said signal voltage with an adjustable reference voltage corresponding to the desired final temperature of the recording material, and supplying the adjustable quantity of heat in response to the difference between the reference voltage and the desired final temperature.

3. Apparatus for recording and erasing an image on thermoplastic recording material comprising:
- means for heating said thermoplastic recording material,
- means for sensing the temperature of said recording material,
- control means responsive to said sensing means for supplying an adjustable quantity of heat to said heating means in accordance with the temperature of said recording material,
- wherein said means for sensing the temperature of said recording material is said means for heating said recording material,
- wherein the heating means forms one arm of a resistance bridge circuit, and
- wherein the heating means comprises a transparent plate having a conductive layer therein and disposed adjacent a polyester film with said thermoplastic recording material thereon.

4. Apparatus for recording and erasing an image on thermoplastic recording material comprising:
- means for heating said thermoplastic recording material,
- means for sensing the temperature of said recording material,
- control means responsive to said sensing means for supplying an adjustable quantity of heat to said heating means in accordance with the temperature of said recording material,
- wherein said means for sensing the temperature of said recording material is said means for heating said recording material,
- wherein the heating means forms one arm of a resistance bridge circuit, and
- wherein a heating current source is connected to the resistance bridge circuit to supply heating and sensing current for the heating means.

5. Apparatus as recited in claim 4 wherein direct current source is provided as the heating current source.

6. Apparatus as recited in claim 4 wherein an alternating current source is provided as the heating current source.

7. Apparatus as recited in claim 4 wherein the heating means and a first fixed resistor form a first pair of bridge arms through which a heating current passes and a second fixed resistor and a variable resistor form a second pair of bridge arms for the zero point adjustment of the resistance bridge circuit and for obtaining a reference potential for sensing the temperature of the recording material.

8. Apparatus as recited in claim 7 wherein said variable resistor for the zero belance of the resistance bridge circuit comprises the combination of a resistance decade and a precision potentiometer.

9. Apparatus as recited in claim 4 further comprising a heating current source for supplying heating current to said heating and sensing resistance bridge circuit, and switch operative to connect one of said heating current source and said voltage source to said bridge circuit.

10. Apparatus as recited in claim 9 wherein said control means comprises in series connection:
- a d.c. differential amplifier connected to said bridge circuit,
- a low pass filter for suppressing main voltage disturbances, and
- a comparator to which a reference voltage source is connected for feeding an adjustable reference voltage, said comparator providing an output signal for regulating said heating means.

11. Apparatus as recited in claim 10 wherein a coupling element is provided between the filter and the comparator to couple the output of the filter to the input of the comparator without a direct d.c. path.

12. Apparatus as recited in claim 11 wherein the output of the comparator is connected to a relay arrangement.

13. Apparatus as recited in claim 12 wherein the relay arrangement has a first relay and a second relay, a first relay contact of the first relay connected in series with a starting switch, the second relay and with a current source; a second relay contact of the second relay, arranged in parallel with the starting switch for maintaining the flow of current through the second relay for the heating period of the heating means from the heating current source; and a first relay contact of the second relay in circuit with said heating means for interrupting the current to the heating means after the preselected final temperature of the heating means has been reached, thereby energizing the first relay and opening the first relay contact.

14. Apparatus as recited in claim 9 wherein the control means comprises an alternating current differential amplifier, the output of which is connected to a rectifier stage connected to a low-pass filter.

15. Apparatus as recited in claim 9 wherein a d.c. voltage representing temperature is derived from the heating means, and the control means comprises a reference voltage source connected to a comparator to supply a preselectable reference voltage thereto, said d.c. voltage fed to said comparator and said comparator output signal triggering a relay arrangement for disconnecting said heating current source from said heating means when said d.c. voltage and the reference voltage are of the same amplitude.

16. Apparatus as recited in claim 9 wherein the control means comprises a subtraction unit in which a reference voltage and a voltage representing temperature derived from the heating means are subtracted from one another, said control means further comprising a multivibrator for receiving the differential voltage from said subtraction unit, said multivibrator triggered by a pulse generator with pulses of adjustable repetition frequency, the duration of the output pulse of the multivibrator dependent on the amplitude of the said differential voltage.

17. Apparatus as recited in claim 16 wherein the output pulses of the multivibrator control a relay stage, of which a relay contact is arranged in a current supply line for heating the heating means by the heating current source, wherein the relay contact opens and closes the current supply line to the heating means under control of the output pulses from the multivibrator.

18. Apparatus as recited in claim 16 wherein the output pulses of the multivibrator control a semi-conductor power switch which is arranged in a current supply line to the heating means and switches the heating of the heating means on and off under control of the output pulses from the multivibrator.

19. Apparatus as recited in claim 16 wherein the reference voltage is selected in such a manner that the duration of the output pulses of the multivibrator dependent on the differential voltage has a maximum value when the temperature of the thermoplastic recording material has an original value below the preselected final temperature, and the duration of the output pulses assumes a minimal value at which substantially zero further heating of the recording material occurs, when the temperature of the recording material has reached its final value.

* * * * *